US012681800B2

(12) United States Patent
Hariharan et al.

(10) Patent No.: US 12,681,800 B2
(45) Date of Patent: Jul. 14, 2026

(54) FREEDOM FROM INTERFERENCE (FFI) IN ELECTRONICS SYSTEMS

(71) Applicant: QUALCOMM Incorporated, San Diego, CA (US)

(72) Inventors: Sriram Hariharan, San Diego, CA (US); Ghanashyam Prabhu, San Diego, CA (US); Yuwen Zou, San Jose, CA (US); Deepak Kumar Agarwal, Bangalore (IN); Alexis Gabriel Marcel Boutillier, Caen (FR); Subbarao Palacharla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 18/798,696

(22) Filed: Aug. 8, 2024

(65) Prior Publication Data

US 2026/0044409 A1 Feb. 12, 2026

(51) Int. Cl.
*G06F 11/07* (2006.01)

(52) U.S. Cl.
CPC ...... *G06F 11/0796* (2013.01); *G06F 11/0739* (2013.01); *G06F 2201/87* (2013.01)

(58) Field of Classification Search
CPC ............. G06F 11/0739; G06F 11/0796; G06F 2201/87
See application file for complete search history.

(56) References Cited

U.S. PATENT DOCUMENTS

| | | |
|---|---|---|
| 2015/0175170 A1 | 6/2015 | Aoki |
| 2017/0083391 A1 | 3/2017 | Robertson et al. |
| 2022/0392280 A1 | 12/2022 | Wei et al. |
| 2023/0036117 A1 | 2/2023 | Krishnani et al. |
| 2023/0205672 A1* | 6/2023 | Kowkutla ............. G06F 13/102 712/227 |
| 2023/0342503 A1 | 10/2023 | Zhao et al. |
| 2024/0134730 A1* | 4/2024 | Aneja ................. G06F 11/0772 |
| 2024/0326867 A1* | 10/2024 | Hariharan ........... B60W 50/045 |

(Continued)

FOREIGN PATENT DOCUMENTS

DE          102022117475 A1          2/2023

OTHER PUBLICATIONS

Fuhrman T., et al., "On Designing Software Architectures for Next-Generation Multi-Core ECUs", SAE International, Electron System vol. 8, No. 1, Published on Apr. 14, 2015, pp. 115-123.

(Continued)

*Primary Examiner* — Joseph R Kudirka
(74) *Attorney, Agent, or Firm* — Loza & Loza LLP

(57) ABSTRACT

Aspects of the disclosure are directed to implementation of a freedom from interference (FFI) safety mechanism. In accordance with one aspect, the disclosure includes initiating a fault handling for a first automotive safety integrity level (ASIL) domain based on a main domain hardware error message; sending a traffic isolation request message for the first ASIL domain; sending a traffic block request message for the first ASIL domain; and executing a block operation and a flush operation on the first ASIL domain based on the traffic isolation request message and the traffic block request message to implement freedom from interference (FFI).

44 Claims, 8 Drawing Sheets

(56) References Cited

U.S. PATENT DOCUMENTS

2025/0208792 A1 * 6/2025 Lee ..................... G06F 13/1668

OTHER PUBLICATIONS

Arena A., et al., "A Case Study in Obtaining Freedom from Interference in a Mixed-ASIL Architecture", 2023 Annual Reliability and Maintainability Symposium (RAMS), IEEE, Jan. 23, 2023, 7 Pages, XP034325549, The Whole Document.
International Search Report and Written Opinion PCT/US2025/036701 ISA/EPO Nov. 13, 2025.
Obradov A., et al., "A Tool for Detecting Memory Interference Between AUTOSAR Software Components of Different ASIL", 2024 Zooming Innovation in Consumer Technologies Conference (ZINC), IEEE, May 22, 2024, pp. 25-30, XP034634115, The Whole Document.

* cited by examiner

200

210

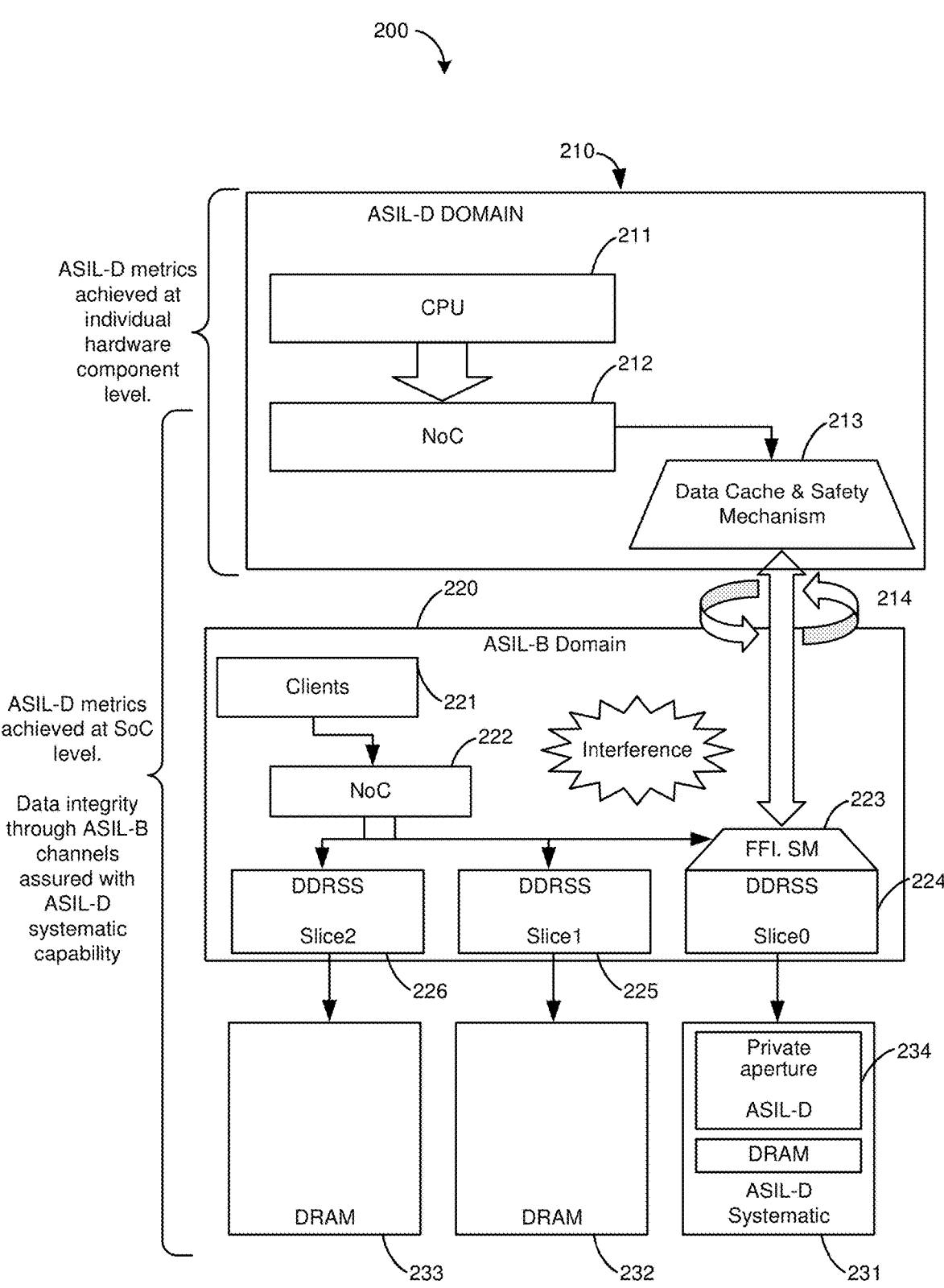

ASIL-D metrics
achieved at
individual
hardware
component
level.

ASIL-D DOMAIN

211

CPU

212

NoC

213

Data Cache & Safety
Mechanism

214

220

ASIL-B Domain

ASIL-D metrics
achieved at SoC
level.

Data integrity
through ASIL-B
channels
assured with
ASIL-D
systematic
capability Clients

221

222

NoC

Interference

FFI. SM

223

224

DDRSS

Slice2

DDRSS

Slice1

DDRSS

Slice0

226

225

DRAM

DRAM

Private
aperture

ASIL-D

234

DRAM

ASIL-D
Systematic

810 ─┐ receive a main domain hardware error message from a first automotive safety integrity level (ASIL) domain

820 ─┐ initiate a fault handling for the first ASIL domain based on the main domain hardware error message

830 ─┐ send a traffic isolation request message for the first ASIL domain

840 ─┐ send a traffic block request message for the first ASIL domain

850 ─┐ send a block and flush request message for the first ASIL domai

860 ─┐ execute a block operation and a flush operation on the first ASIL domain

870 ─┐ receive at least one acknowledgment message to indicate completion of the block operation and the flush operation on the first ASIL domain

FREEDOM FROM INTERFERENCE (FFI) IN ELECTRONICS SYSTEMS

TECHNICAL FIELD

This disclosure relates generally to the field of electronic systems, and, in particular, to freedom from interference (FFI) in electronic systems.

BACKGROUND

In one aspect, an automotive electronic system is subject to stringent safety requirements. International safety standard ISO 26262 defines "freedom from interference (FFI)" as an absence of cascading failures which could lead to violation of a safety requirement in an automobile.

SUMMARY

An automotive electronic system which has shared memory for a plurality of processors may need to be designed with FFI compliance to ensure a safe driving experience. The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides implementation of freedom from interference (FFI) in electronic systems. Accordingly, the present disclosure discloses an apparatus including: a system fault handler configured to perform a fault handling; a domain isolation control module coupled to the system fault handler, the domain isolation control module configured to receive a traffic isolation request message; and a shared communication channel coupled to the domain isolation control module, the shared communication channel configured to execute a block operation and a flush operation based on the traffic isolation request message to implement freedom from interference (FFI).

In one example, the domain isolation control module is further configured to send a traffic block request message. In one example, the apparatus further includes a first automotive safety integrity level (ASIL) domain coupled to the shared communication channel, the first ASIL domain configured to generate a main domain traffic. In one example, the apparatus further includes a second automotive safety integrity level (ASIL) domain coupled to the shared communication channel, the second ASIL domain configured to generate a safety domain traffic. In one example, the block operation and the flush operation are executed on the first ASIL domain.

Another aspect of the disclosure provides an apparatus including: a system fault handler configured to perform a fault handling; a domain flow control module coupled to the system fault handler, the domain flow control module configured to send a block and flush request message; and a shared communication channel coupled to the domain isolation control module, the shared communication channel configured to execute a block operation and a flush operation based on the block and flush request message to implement freedom from interference (FFI).

In one example, the domain flow control module is configured to receive a traffic block request message. In one example, the apparatus further includes a first automotive safety integrity level (ASIL) domain coupled to the shared communication channel, the first ASIL domain configured to generate a main domain traffic. In one example, the apparatus further includes a second automotive safety integrity level (ASIL) domain coupled to the shared communication channel, the second ASIL domain configured to generate a safety domain traffic. In one example, the block operation and the flush operation are executed on the first ASIL domain.

Another aspect of the disclosure provides an apparatus including: a system fault handler configured to perform a fault handling; a domain isolation control module coupled to the system fault handler, the domain isolation control module configured to receive a traffic isolation request message; a domain flow control module coupled to the system fault handler, the domain flow control module configured to send a block and flush request message; and a shared communication channel coupled to the domain isolation control module, the shared communication channel configured to execute a block operation and a flush operation based on the traffic isolation request message and the block and flush request message, the block operation and the flush operation executed on a first automotive safety integrity level (ASIL) domain implement freedom from interference (FFI).

In one example, the domain isolation control module is further configured to send a traffic block request message. In one example, the domain flow control module is configured to receive a traffic block request message. In one example, the first ASIL domain is configured to generate a main domain traffic.

In one example, the apparatus further includes a second automotive safety integrity level (ASIL) domain coupled to the shared communication channel, the second ASIL domain configured to generate a safety domain traffic. In one example, the domain isolation control module is further configured to send a traffic block request message. In one example, the domain flow control module is configured to receive a traffic block request message.

Another aspect of the disclosure provides an apparatus including: means for initiating a fault handling for a first automotive safety integrity level (ASIL) domain based on a main domain hardware error message; means for sending a traffic isolation request message for the first ASIL domain; means for sending a traffic block request message for the first ASIL domain; and means for executing a block operation and a flush operation on the first ASIL domain based on the traffic isolation request message and the traffic block request message to implement freedom from interference (FFI).

In one example, the apparatus further includes means for receiving the main domain hardware error message from the first automotive safety integrity level (ASIL) domain. In one example, the apparatus further includes means for sending a block and flush request message for the first ASIL domain. In one example, the apparatus further includes means for receiving at least one acknowledgment message to indicate completion of the block operation and the flush operation on the first ASIL domain.

Another aspect of the disclosure provides a method including: initiating a fault handling for a first automotive safety integrity level (ASIL) domain based on a main domain hardware error message; sending a traffic isolation request message for the first ASIL domain; sending a traffic block request message for the first ASIL domain; and executing a block operation and a flush operation on the first ASIL domain based on the traffic isolation request message and the traffic block request message to implement freedom from interference (FFI).

In one example, the main domain hardware error message includes a latent fault checking with duplication. In one example, the main domain hardware error message is a notification of a latent fault in isolation control. In one example, the main domain hardware error message is a notification of a latent fault in flow control. In one example, the notification of the latent fault in flow control includes a lock step check. In one example, the main domain hardware error message is a notification of an interface protocol fault.

In one example, the interface protocol fault is an invalid request/response command. In one example, the interface protocol fault is an illegal address. In one example, the interface protocol fault is an error correction code (ECC) error. In one example, the interface protocol fault is a parity error. In one example, the interface protocol fault is a package data fault error. In one example, the interface protocol fault is a timeout error.

In one example, the traffic isolation request message implements a full isolation of a second automotive safety integrity level (ASIL) domain from the first ASIL domain. In one example, the second ASIL domain is an ASIL-D domain as defined by ISO 26262. In one example, the second ASIL domain is at a higher safety integrity level than the first ASIL domain.

In one example, the method further includes receiving the main domain hardware error message from the first automotive safety integrity level (ASIL) domain. In one example, the first ASIL domain is an ASIL-B domain as defined by ISO 26262. In one example, the first ASIL domain is a main domain island. In one example, the traffic block request message initiates blocking of a main domain traffic in the main domain island.

In one example, the method further includes sending a block and flush request message for the first ASIL domain. In one example, the block and flush request message initiates the block operation and the flush operation on the main domain traffic. In one example, the method further includes receiving at least one acknowledgment message to indicate completion of the block operation and the flush operation on the first ASIL domain.

In one example, the at least one acknowledgment message includes one or more of the following: an acknowledgment of completion of the block operation and the completion of the flush operation, an acknowledgment of traffic block completion and an acknowledgment of domain isolation completion.

Another aspect of the disclosure provides a non-transitory computer-readable medium storing computer executable code, operable on a device including at least one processor and at least one memory coupled to the at least one processor, wherein the at least one processor is configured to implement freedom from interference (FFI), the computer executable code including: instructions for causing a computer to initiate a fault handling for a first automotive safety integrity level (ASIL) domain based on a main domain hardware error message; instructions for causing the computer to send a traffic isolation request message for the first ASIL domain; instructions for causing the computer to send a traffic block request message for the first ASIL domain; and instructions for causing the computer to execute a block operation and a flush operation on the first ASIL domain based on the traffic isolation request message and the traffic block request message.

In one example, the non-transitory computer-readable medium of claim further includes instructions for causing the computer to receive the main domain hardware error message from the first automotive safety integrity level (ASIL) domain. In one example, the non-transitory computer-readable medium of claim further includes instructions for causing the computer to send a block and flush request message for the first ASIL domain. In one example, the non-transitory computer-readable medium of claim further includes instructions for causing the computer to receive at least one acknowledgment message to indicate completion of the block operation and the flush operation on the first ASIL domain.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 2 illustrates a first example system on a chip (SoC) in an automotive electronics system.

FIG. 8 illustrates an example flow diagram for implementing a freedom from interference (FFI) safety mechanism.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

International safety standard ISO 26262 (Road vehicles—functional safety) defines a hierarchy of automotive safety integrity levels (ASILs) for various automotive functions, with ASIL-A being the lowest integrity domain (e.g., loss of taillights) and ASIL-D being the highest integrity domain (e.g., loss of brake function). ISO 26262 includes a number of definitions for safety integrity such as "freedom from interference (FFI)". FFI is defined as an absence of cascading failures which could lead to violation of a safety requirement in an automobile. That is, FFI compliance means that a single failure in the automotive electronics system does not propagate as a safety violation.

Figure 1:
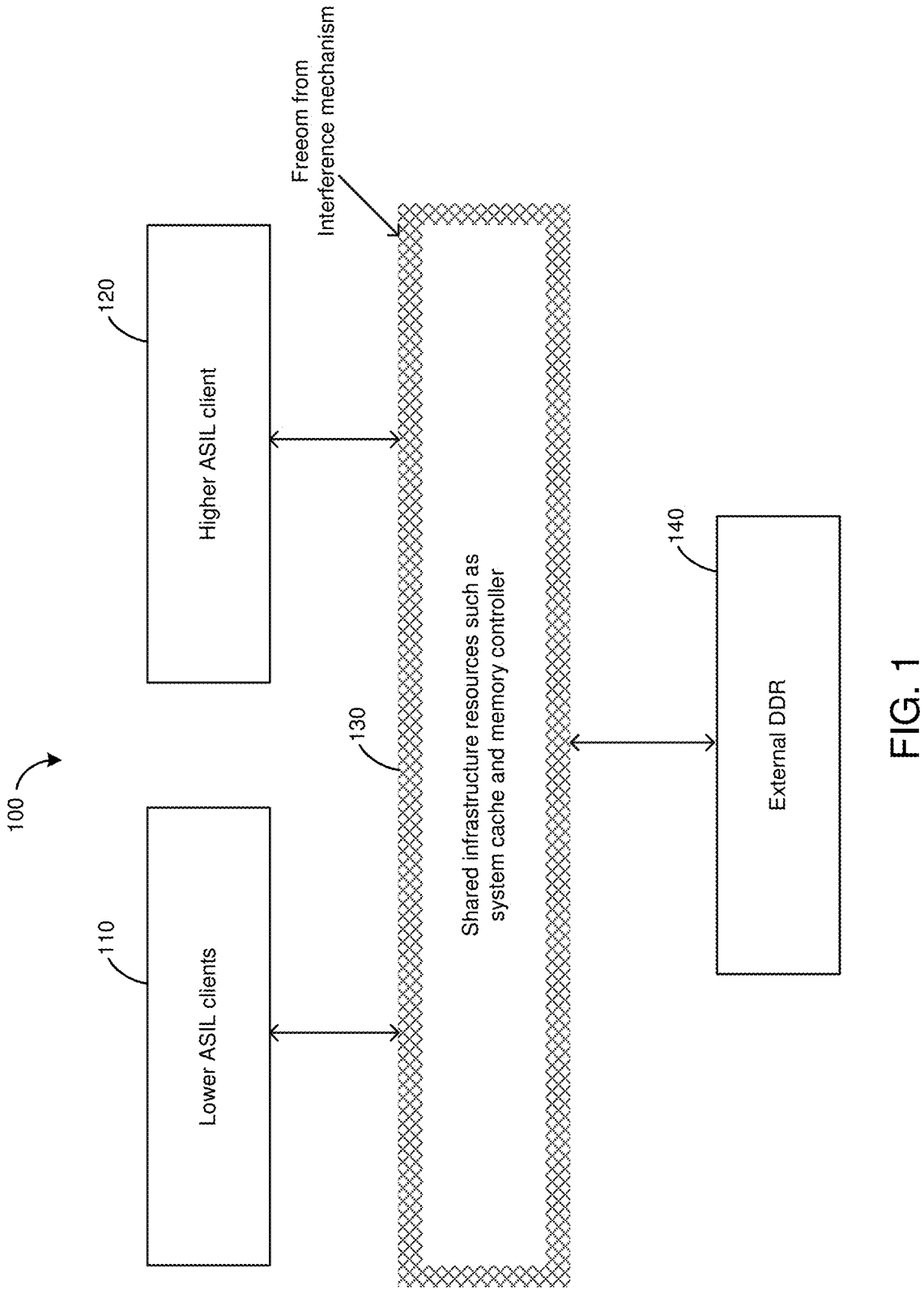
FIG. 1 illustrates an example automotive electronics architecture.

FIG. 1 illustrates an example automotive electronics architecture 100. In one example, the example automotive electronics architecture 100 includes a lower ASIL client 110 and a higher ASIL client 120. In one example, the lower ASIL client 110 is an element in the automotive electronics architecture 100 which has a lower integrity level than the higher ASIL client 120. In one example, the example automotive electronics architecture 100 also includes a shared infrastructure resource 130 such as a system cache memory or a memory controller. For example, the shared infrastructure resource 130 is coupled to an external memory 140 (e.g., a double data rate (DDR) memory).

In one example, different ASIL clients accessing a common or shared system memory may be vulnerable to interference, i.e., a fault in a first ASIL client may degrade operation in a second ASIL client. For example, a shared memory such as a system cache memory and a memory controller may be shared between a lower ASIL client and a higher ASIL client. In one example, a fault in a lower ASIL client may adversely impact a higher ASIL client which results in a non-compliance to ASIL requirements (e.g., FFI requirements). In one example, the automotive electronics system needs a safety mechanism to provide FFI between two ASIL clients with different integrity levels.

FIG. 2 illustrates a first example system on a chip (SoC) 200 in an automotive electronics system. In one example, the SoC 200 includes a first ASIL domain (e.g., ASIL-D domain) 210 with a central processing unit (CPU) 211, a first network on a chip (NOC) 212 and a data cache/safety mechanism module 213. In one example, ASIL-D metrics in the first ASIL domain 210 are achieved at an individual hardware component level. In one example, the first ASIL domain 210 is at the highest integrity domain.

In one example, the SoC 200 includes a second ASIL domain (e.g., ASIL-B domain) 220. In one example, the second ASIL domain 220 includes a plurality of client applications 221, a second NOC 222, a freedom from interference safety mechanism (FFI-SM) module 223 connected to a first memory controller (e.g., DDRSS Slice0) 224, a second memory controller (e.g., DDRSS Slice1) 225 and a third memory controller (e.g., DDRSS Slice2) 226. In one example, the second ASIL domain 220 is at the third highest integrity domain. That is, the second ASIL domain 220 is at a lower integrity domain than the first ASIL domain 210. In one example, the first ASIL domain 210 is connected to the second ASIL domain 220 via an inter-domain interface 214.

In one example, the SoC 200 also includes a first external memory 231, a second external memory 232 and a third external memory 233. In one example, the first external memory 231 is connected to the first memory controller 224, the second external memory 232 is connected to the second memory controller 225 and the third external memory 233 is connected to the third memory controller 226. In one example, the first external memory 231 includes a private aperture 234. In one example, the private aperture 234 is a portion of the first external memory 231 dedicated to the CPU 211 and not accessible by the plurality of client applications 221. In one example, the private aperture 234 retains safety-critical memory content for the CPU 211 which is protected by the FFI-SM module 223. The protection is from visibility, modification and serviceability by the plurality of client application 221. In one example, if the contents of the private aperture 234 are modified by the plurality of client application 221, a safety goal or policy may be violated in the ASIL-D domain. For example, a safety goal violation may be where incorrect data from the first external memory 231 is returned to the CPU 211 for execution and a safety fault occurs (e.g., "airbag fails to deploy" upon an auto accident).

In one example, the SoC 200 includes a plurality of ASIL domains. For example, ASIL-D domain traffic may be generated and stored in a lower integrity domain, e.g., ASIL-B domain. For example, ASIL-B domain traffic is also generated and stored in the lower integrity domain, e.g., ASIL-B domain. In one example, the first memory controller 224 may be an interference point for ASIL-D domain traffic and ASIL-B domain traffic. In one example, the FFI-SM module 223 enables interference avoidance in the SoC 200. In one example, the FFI-SM module 223 implements data integrity through ASIL-B channels assured with ASIL-D systematic capability.

Figure 3:
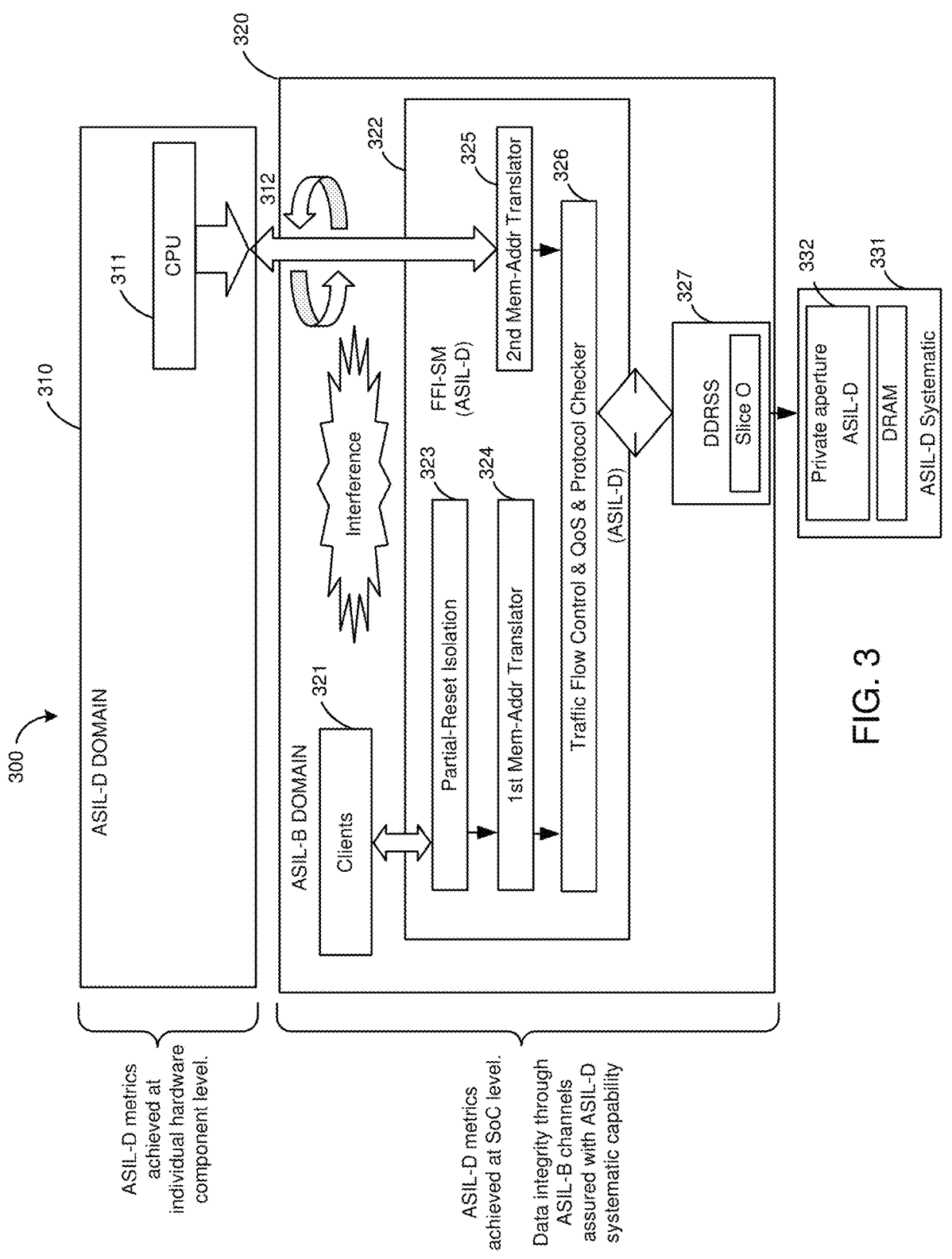
FIG. 3 illustrates a second example system on a chip (SoC) in an automotive electronics system.

FIG. 3 illustrates a second example system on a chip (SoC) 300 in an automotive electronics system. In one example, the SoC 300 includes a first ASIL domain (e.g., ASIL-D domain) 310 with a central processing unit (CPU) 311. In one example, ASIL-D metrics in the first ASIL domain 310 are achieved at an individual hardware component level. In one example, the first ASIL domain 310 is at the highest integrity domain.

In one example, the SoC 300 includes a second ASIL domain (e.g., ASIL-B domain) 320. In one example, the second ASIL domain 320 includes a plurality of client applications 321 and a freedom from interference safety mechanism (FFI-SM) module 322 connected to a memory controller (e.g., DDRSS Slice0) 327. In one example, the FFI-SM module 322 includes a partial-reset isolation block 323, a first memory address translator 324 connected to the plurality of client applications 321, a second memory address translator 325 connected to the CPU 311 and a traffic flow control/quality of service (QoS)/protocol checker block 326. In one example, the second ASIL domain 320 is at the third highest integrity domain. That is, the second ASIL domain 320 is at a lower integrity domain than the first ASIL domain 310. In one example, the first ASIL domain 310 is connected to the second ASIL domain 320 via an inter-domain interface 312.

In one example, the SoC 300 also includes an external memory 331. In one example, the external memory 331 is connected to the memory controller 327. In one example, the external memory 331 includes a private aperture 332.

In one example, the FFI-SM module 322 provides for freedom from interference (FFI) between a first ASIL domain path and a second ASIL domain path to the external memory 331. In one example, a transient fault on the second ASIL domain path may cause a denial of service (DoS) on the first ASIL domain path. In one example, the first ASIL domain path may provide memory address translation in the first memory address translator 324 and the second ASIL domain path may provide memory address translation in the second address translator 325.

In one example, the FFI-SM module 322 may fully isolate and support a partial reset of the second ASIL domain 320 while allowing full access to the external memory 331 for the first ASIL domain 310. In one example, the FFI-SM module 322 may implement a protocol checker and timeout function using the traffic flow control/quality of service (QoS)/protocol checker block 326 to detect and report errors on an interface protocol to the memory controller 327. In one example, the FFI-SM module 322 may implement ASIL-D grade control path logic with latent fault checkers and duplication. In one example, the FFI-SM module 322 implements data integrity through ASIL-B channels assured with ASIL-D systematic capability. In one example, ASIL-D systematic capability refers to a rigorous hardware development process including rigorous quality management of specifications, verification, testing, manufacturing, maintenance, etc. In one example, a systematic failure is a deterministic fault in hardware development, manufacture or maintenance. For example, a hardware design fault where an interconnection is missed may violate a safety goal (e.g., an incorrect DRAM data returned which causes an airbag indicator not turning on).

Figure 4:
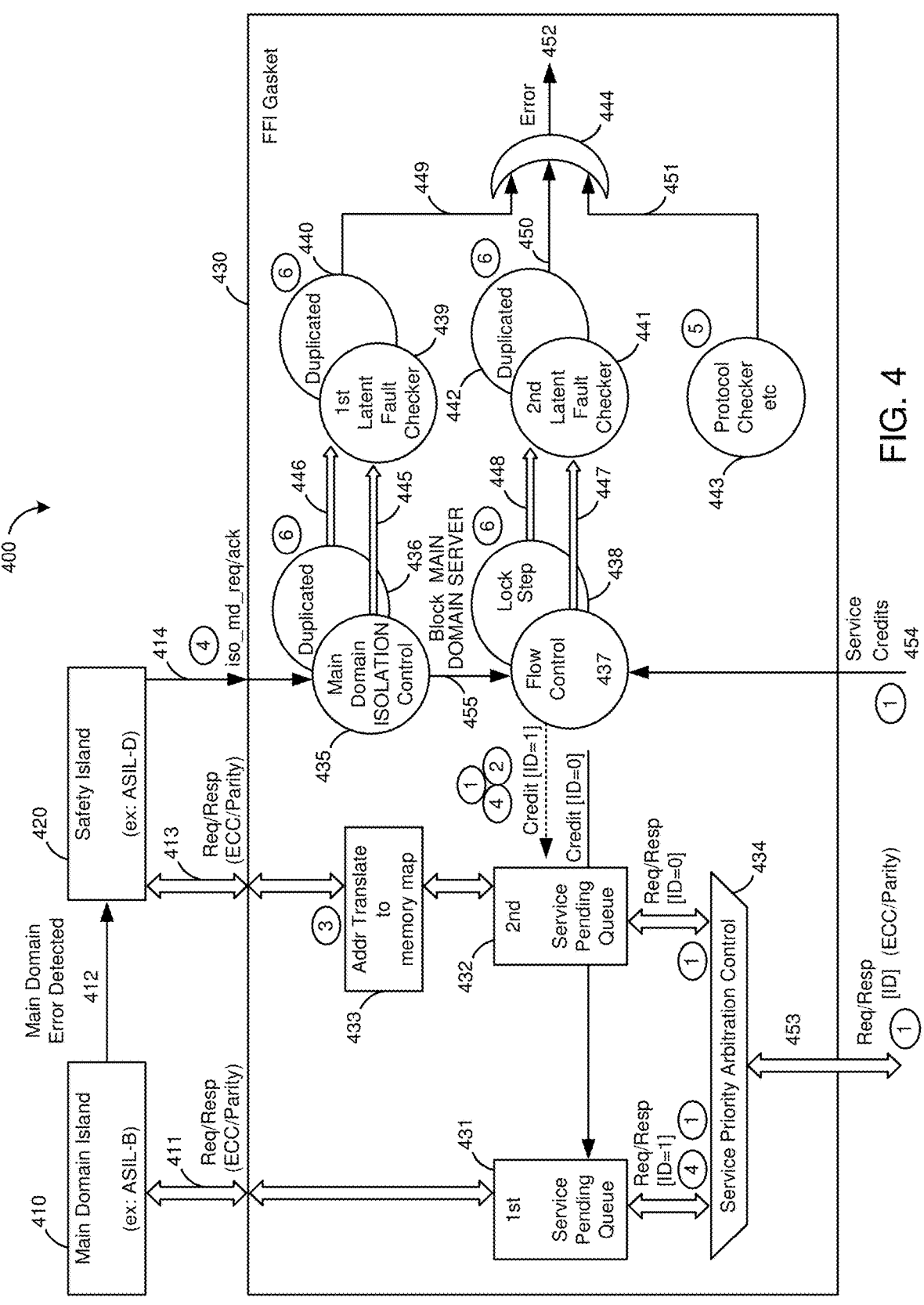
FIG. 4 illustrates an example functional diagram for a freedom from interference (FFI) safety mechanism.

FIG. 4 illustrates an example functional diagram for a freedom from interference (FFI) safety mechanism 400. In one example, the FFI safety mechanism 400 includes a first ASIL domain 410 (e.g., main domain or ASIL-B) and a second ASIL domain 420 (e.g., safety island or ASIL-D). In one example, the first ASIL domain 410 is a third highest integrity domain and the second ASIL domain 420 is a highest integrity domain. In one example, the first ASIL domain 410 is connected to the second ASIL domain 420 via an inter-domain interface 412.

In one example, the first ASIL domain 410 is connected to a FFI module 430 (e.g., FFI gasket) via a first domain interface 411, and the second ASIL domain 420 is connected to the FFI module 430 via a second domain interface 413. In one example, the first domain interface 411 transports first request messages and first response messages between the first ASIL domain 410 and the FFI module 430. In one example, the second domain interface 413 transports second request messages and second response messages between the second ASIL domain 420 and the FFI module 430. In one example, the first request messages, first response messages, the second request messages and the second response messages may include error correction coding (ECC) bits and/or parity bits for error detection.

In one example, the FFI module 430 includes a first service pending queue 431 connected to the first domain interface 411, and a second service pending queue 432 connected to an address translator 433 which is in turn is connected to the second domain interface 413. In one example, the first service pending queue 431 provides a first arbitration input to a service priority arbitration control function 434, and the second service pending queue 432 provides a second arbitration input to the service priority arbitration control function 434. In one example, the service priority arbitration control function 434 exchanges external request messages and external response messages over an arbitration output 453 to an external memory (not shown). In one example, the external request messages and external response messages may include ECC bits and/or parity bits for error detection.

In one example, the second ASIL domain 420 connects to the FFI module 430 via an isolation interface 414. In one example, the isolation interface 414 transports isolation request messages and isolation acknowledgment messages to a main domain isolation control function 435 and a duplicated main domain isolation control function 436. In one example, the main domain isolation control function 435 sends a block domain service message 455 to a flow control function 437 and a lock step function 438.

In one example, the main domain isolation control function 435 sends a first fault checker message 445 to a first latent fault checker function 439, and the duplicated main domain isolation control function 436 sends a first duplicated fault checker message 446 to a first duplicated latent fault checker function 440. In one example, the first latent fault checker function 439 or the first duplicated latent fault checker function 440 send a first latent fault message 449 to a logical OR function 444.

In one example, the flow control function 437 sends a second latent fault checker message 447 to a second latent fault check function 441, and the lock step function 438 sends a second duplicated fault checker message 448 to a second duplicated latent fault checker function 442. In one example, the second latent fault checker function 441 or the second duplicated latent fault checker function 442 send a second latent fault message 450 to the logical OR function 444.

In one example, a protocol checker function 443 sends a protocol check message 451 to the logical OR function 444. In one example, if at least one of the first latent fault message 449, the second latent fault message 450 and the protocol check message 451 is asserted to indicate a fault is present, then the logical OR function 444 provides a fault output message 452 which is asserted to indicate a fault has been detected by the FFI module 430.

In one example, the FFI module 430 also receives a service credit message 454 from the external memory (not shown). In one example, the service credit message 454 is received by the flow control function 437.

In one example, the FFI module 430 implements a freedom from interference (FFI) implementation between a first data path in the first ASIL domain 410 and a second data path in the second ASIL domain 420. In one example, the FFI implementation is executed by the service priority arbitration control function 434.

In one example, transient faults on the first data path in the first ASIL domain 410 may cause denial of service (DoS) on the second data path in the second ASIL domain 420. In one example, management of transient faults is executed by the flow control function 437.

In one example, the FFI module 430 implements a memory address translation operation. In one example, the memory address translation operation is performed in the address translator 433.

In one example, the FFI module 430 implements a full isolation and partial reset function of the first ASIL domain 410 to allow unimpeded external memory access for the second ASIL domain 420. In one example, the full isolation and partial reset function is performed in the service priority arbitration control function 434. In one example, a full isolation is a total separation between the first ASIL domain 410 and the second ASIL domain 420. In one example, a partial reset is a reset of a subset of all automotive functions controlled by a system on a chip (Soc) which enables smooth system recovery without rebooting the entire SoC.

In one example, the FFI module 430 implements a protocol checker function and timeout function to detect and report interface protocol errors to a memory controller. In one example, the protocol checker function and timeout function is performed by the protocol checker function 443. In one example, the memory controller may be the first memory controller 224 in FIG. 2. In one example, the memory controller may be the memory controller 327 in FIG. 3.

In one example, the FFI module 430 implements ASIL-D grade control path logic with latent fault checkers and duplication. In one example, the ASIL-D grade control path logic is performed by the main domain isolation control function 435, the duplicated main domain isolation control function 436, the flow control function 437, the lock step function 438, the first latent fault checker function 439 and the second latent fault checker function 441.

Figure 5:
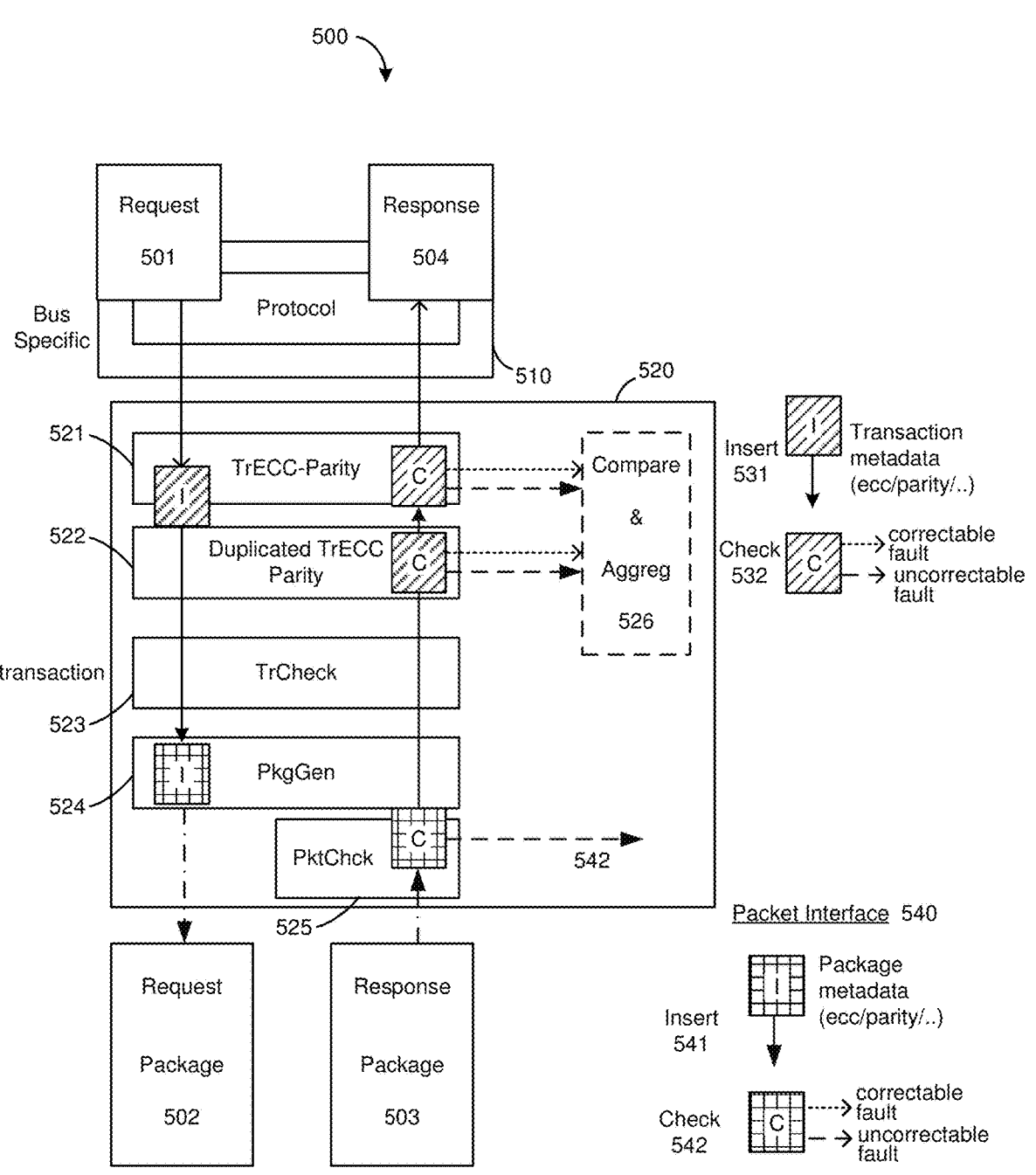
FIG. 5 illustrates an example interface bus protocol checker logical diagram.

FIG. 5 illustrates an example interface bus protocol checker logical diagram 500. In one example, a request message 501 is received by a bus specific protocol interface 510 and is relayed to a transaction ECC-parity error detection block 521. In one example, the transaction ECC-parity error detection block 521 inserts metadata into a duplicated transaction ECC-parity error detection block 522. In one example, the transaction ECC-parity error detection block 521 and the duplicated transaction ECC-parity error detection block 522 determine if an ECC error or a parity error exists and generate an ECC/parity error notification message.

In one example, the duplicated transaction ECC-parity error detection block 522 sends the request message 501 and the metadata to a transaction checker block 523. In one example, the transaction checker block 523 determines if the request message 501 is invalid, if the request message 501 has an illegal address, or if the request message 501 has some other transaction error.

In one example, the transaction checker block 523 relays the request message 501 to a package generation block 524 to generate a request package message 502. In one example, a response package 503 is received by a packet checker block 525. In one example, the packet checker block 525 determines if the response package 503 has an uncorrectable fault and generates an uncorrectable fault notification message 542.

In one example, the packet checker block 525 relays the response package 503 through the package generation block 524, the transaction checker block 523 and the duplicated transaction ECC-parity error detection block 522. In one example, the duplicated transaction ECC parity error detection block 522 determines if the response package 503 has a fault and sends either a first correctable fault notification message or a first uncorrectable fault notification message to a compare and aggregator function 526.

In one example, the duplicated transaction ECC parity error detection block 522 relays the response package 503 to the transaction ECC parity error detection block 521. In one example, the transaction ECC parity error detection block 521 determines if the response package 503 has a fault and sends either a second correctable fault notification message or a second uncorrectable fault notification message to the compare and aggregator function 526.

In one example, the transaction ECC parity error detection block 521 sends the response package 503 to the bus specific protocol interface 510. In one example, the bus specific protocol interface 510 generates a response message 504 based on the response package 503.

In one example, the bus specific protocol interface 510 handles two bus transaction operations: a bus insert operation 531 and a bus check operation 532. In one example, a packet interface 540 handles two packet transaction operations: a packet insert operation 541 and a packet check operation 542.

Figure 6:
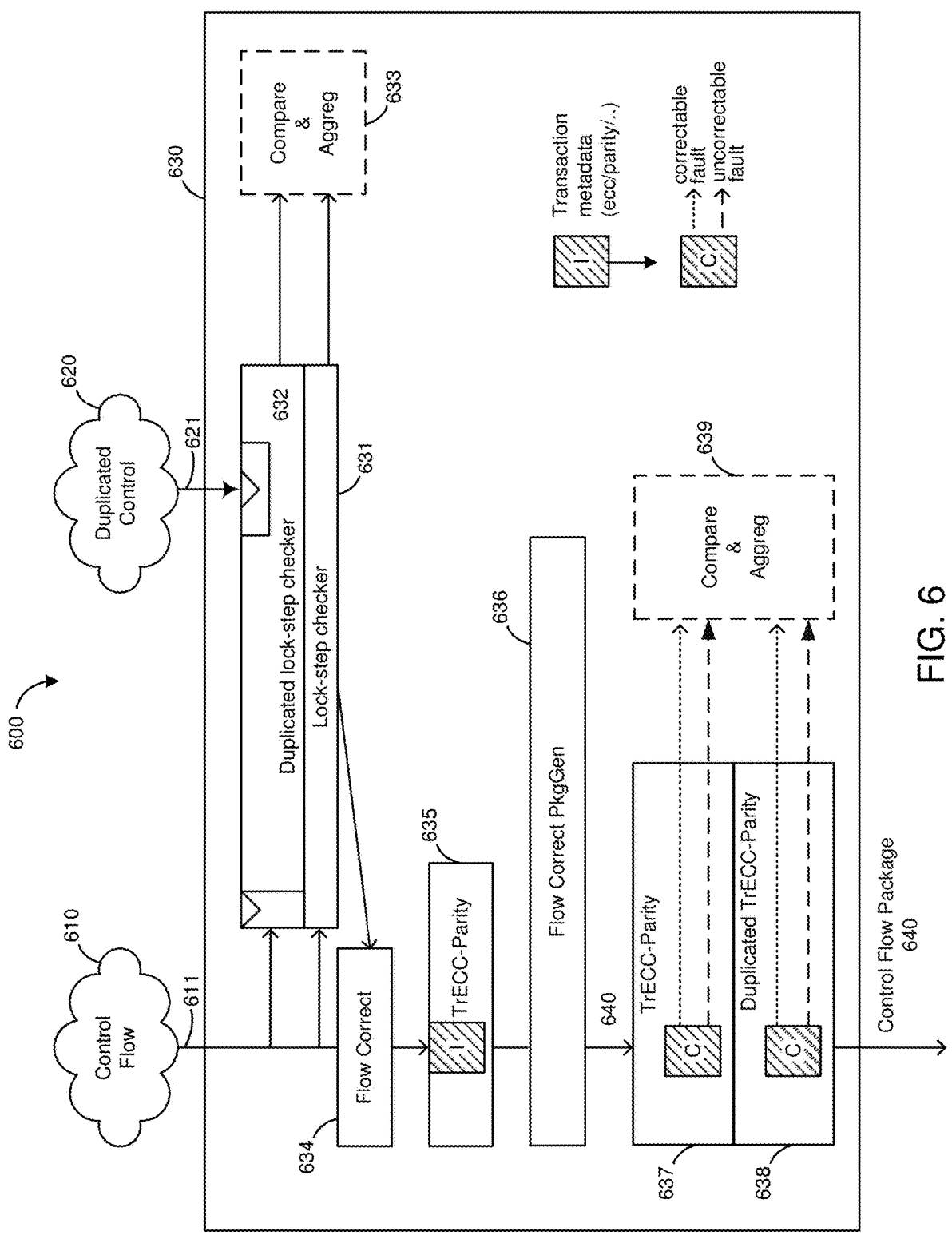
FIG. 6 illustrates an example latent fault checker logical diagram.

FIG. 6 illustrates an example latent fault checker logical diagram 600. In one example, a control flow finite state machine (FSM) 610 provides a first control flow input 611, and a duplicated control FSM 620 provide a second control flow input 621 to a freedom from interference (FFI) flow control logic 630. In one example, both the control flow FSM 610 and the duplicated control flow FSM 620 are provided identical inputs with separation in time and in space.

In one example, the FFI flow control logic 630 includes a lock step checker function 631 and a duplicated lock step checker function 632. In one example, the lock step checker function 631 and the duplicated lock step checker function 632 perform a technique used to detect and ensure that a critical function operates correctly even with a fault or failure present. In one example, the lock step checker function 631 and the duplicated lock step checker function 632 provides inputs to a first compare and aggregator block 633.

In one example, both the lock step checker function 631 and the duplicated lock step checker function 632 are provided identical inputs with separation in time and space. If there is a difference in outputs between the control flow FSM 610 and the duplicated control flow FSM 620, the difference is reported by either the lock step checker function 631 and the duplicated lock step checker function 632. If there is a difference in outputs between the lock step checker function 631 and the duplicated lock step checker function 632, the difference is reported by the first compare and aggregator block 633 after continual comparison of the outputs of the lock step checker function 631 and the duplicated lock step checker function 632. If a difference is detected, the first compare and aggregator block 633 aggregates failure notifications and triggers an error flag for system integrity.

In one example, a flow correction verification function 634 in the FFI flow control logic 630 is initiated by the control flow FSM 610. Next, a first transaction ECC-parity check function 635 in the FFI flow control logic 630 is initiated by the control flow FSM 610 and produces transaction metadata. In one example, a flow control package generator function 636 is initiated by the control flow FSM 610 to generate a control flow package 640. In one example, the second transaction ECC-parity check function 637 determines if the control flow package 640 has a fault and sends either a first correctable fault notification message or a first uncorrectable fault notification message to a second compare and aggregator function 639.

In one example, the control flow package 640 is also processed by a duplicated transaction ECC parity check function 638 prior to being outputted by the FFI flow control logic 630. In one example, the duplicated transaction ECC-parity check function 638 determines if the control flow package 640 has a fault and sends either a second correctable fault notification message or a second uncorrectable fault notification message to the second compare and aggregator function 639.

Figure 7:
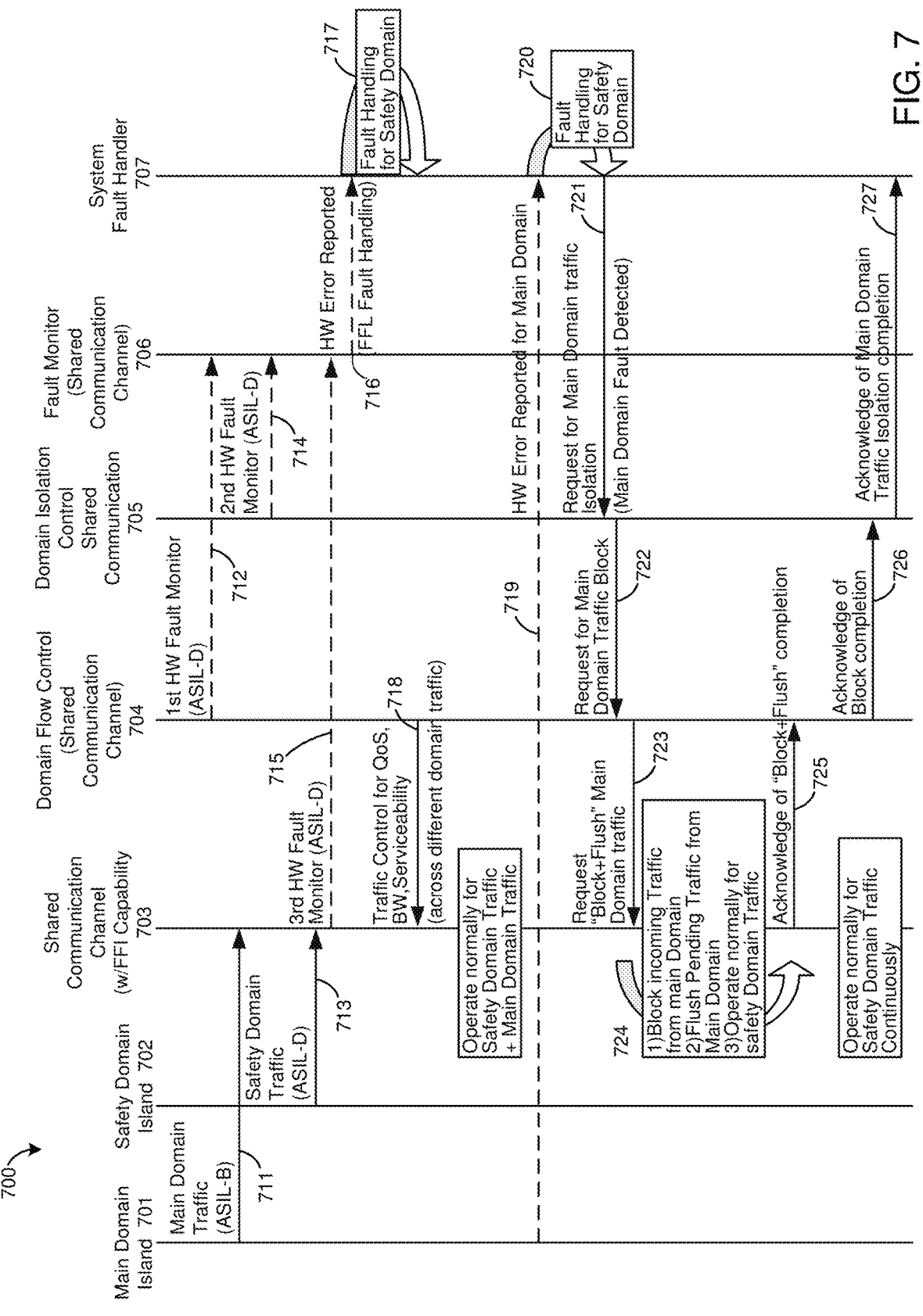
FIG. 7 illustrates an example sequence diagram for a FFI safety mechanism.

FIG. 7 illustrates an example sequence diagram 700 for a FFI safety mechanism. In one example, the example sequence diagram 700 includes the following elements: a first ASIL domain 701 (e.g., main domain island), a second ASIL domain 702 (e.g., safety domain island), a shared communication channel 703 (e.g., with FFI capability), a domain flow control function 704, a domain isolation control function 705, a fault monitor 706 and a system fault handler 707.

In one example, the example sequence diagram 700 commences with a first sequence action 711 where main domain traffic is transported from the first ASIL domain 701 to the shared communication channel 703. In one example, a second sequence action 712 is executed where a first hardware fault on traffic flow control logic is detected (e.g., from the ASIL domain 701, a.k.a., main domain) and is transported from the domain flow control function 704 to the fault monitor 706. The example of traffic flow control fault is the first sequence action 711 (a.k.a., main domain traffic) is blocked due to hardware flow control logic bit flipped on the fly. In one example, a third sequence action 713 is executed where safety domain traffic is transported from the second ASIL domain 702 to the shared communication channel 703. In one example, a fourth sequence action 714 is executed where a second hardware fault monitor signal is detected (e.g., from the second ASIL domain 702) and is transported from the domain isolation control function 705 to the fault monitor 706. The example of traffic domain isolation logic fault is the third sequence action 713 (a.k.a., second domain traffic) is blocked due to the first sequence action 711 (a.k.a., main domain traffic) stalling. In one example, the domain isolation control function is implemented by a domain isolation control module.

In one example, a fifth sequence action 715 is executed where a third hardware fault monitor signal (e.g., from the second ASIL domain 702) is transported from the shared communication channel 703 to the fault monitor 706. In one example, a sixth sequence action 716 is executed where a hardware error report message is generated by the fault monitor 706 and sent to the system fault handler 707 if at least one of the first hardware fault monitor signal, the second hardware fault monitor signal and the third hardware fault monitor signal is asserted high (e.g., if at least hardware fault is present). The example of system fault handler is function Safety micro-controller in SoC, which monitors and handlers SoC Hardware faults on the fly.

In one example, a seventh sequence action 717 is executed where the hardware error report message initiates fault handling operations in the second ASIL domain 702 (e.g., safety domain). In one example, an eighth sequence action 718 is executed where a traffic control message is generated by the domain flow control function 704 and sent to the shared communication channel 703. In one example, the traffic control message is used for quality of service (QoS) operations, bandwidth management, serviceability operations, etc., across a plurality of different domain traffic. In one example, the FFI safety mechanism allows normal operation for traffic from both the first ASIL domain 701 and the second ASIL domain 702.

In one example, a ninth sequence action 719 is executed where a main domain hardware error message is sent from the first ASIL domain 701 to the system fault handler 707. In one example, a tenth sequence action 720 is executed where the main domain hardware error message initiates fault handling operations in the first ASIL domain 701 (e.g., main domain) by the system fault handler 707.

In one example, an eleventh sequence action 721 is executed where the system fault handler 707 sends a request for main domain traffic isolation message to the domain isolation control function 705. In one example, a twelfth sequence action 722 is executed where the domain isolation control function 705 sends a request for main domain traffic block message to the domain flow control function 704. In one example, a thirteenth sequence action 723 is executed where the domain flow control function 704 sends a request block and flush main domain traffic message to the shared communication channel 703. In one example, the domain flow control function 704 is implemented by a domain flow control module.

In one example, a fourteenth sequence action 724 is executed in response to the request block and flush main domain traffic message where the shared communication channel executes block and flush operations on the main domain traffic. In one example, the block and flush operations include a block of incoming traffic from the first ASIL domain 701, a flush of pending traffic from the first ASIL domain 701 and normal operation in the second ASIL 7.

In one example, a fifteenth sequence action 725 is executed in response to the block and flush operations where the shared communication channel 703 sends an acknowledgment message of block and flush completion to the domain flow control function 704. In one example, a sixteenth sequence action 726 is executed where the domain flow control function 704 sends an acknowledgment message of block completion to the domain isolation control function 705. In one example, a seventeenth sequence action 727 is executed where the domain isolation control function 705 sends an acknowledgment message of main domain traffic isolation completion to the system fault handler 707.

FIG. 8 illustrates an example flow diagram 800 for implementing freedom from interference (FFI) in an electronic system. In block 810, receive a main domain hardware error message from a first automotive safety integrity level (ASIL) domain. In one example, a main domain hardware error message is received from a first automotive safety integrity level (ASIL) domain. In one example, the first ASIL domain is a main domain island. In one example, the first ASIL domain is an ASIL-B domain as defined by ISO 26262. In one example, the main domain hardware error message includes latent fault checking with duplication.

In one example, the reception is executed by a system fault handler. In one example, an input/output device may be used to receive a main domain hardware error message. In one example, a receiver may be used to receive a main domain hardware error message. In one example, a transceiver may be used to receive a main domain hardware error message. In another example, a processing engine may be used to receive a main domain hardware error message. In yet another example, a router may be used to receive a main domain hardware error message. In one example, the FFI safety mechanism is part of a system on a chip (SoC).

In block 820, initiate a fault handling for the first ASIL domain based on the main domain hardware error message. In one example, a fault handling is initiated for the first ASIL domain based on the main domain hardware error message. In one example, the main domain hardware error message may be a notification of a latent fault in isolation control. In one example, the main domain hardware error message may be a notification of a latent fault in flow control. In one example, the notification of the latent fault in flow control includes a lock step check.

In one example, the main domain hardware error message may be a notification of an interface protocol fault. In one example, the interface protocol fault is an invalid request/ response command. In one example, the interface protocol fault is an illegal address. In one example, the interface protocol fault is an error correction code (ECC) or parity error. In one example, the interface protocol fault is a package data fault error. In one example, the interface protocol fault is a timeout error. In one example, the fault handling initiation is executed by the system fault handler. In one example, the fault handling initiation is executed by a processing engine. In another example, the fault handling initiation is executed by a fault logic circuitry.

In block 830, send a traffic isolation request message for the first ASIL domain. In one example, a traffic isolation request message is sent for the first ASIL domain. In one example, the traffic isolation request message implements full isolation of a second ASIL domain from the first ASIL domain. In one example, the second ASIL domain is a safety domain island. In one example, the second ASIL domain is an ASIL-D domain as defined by ISO 26262. In one example, the second ASIL domain is at a higher safety integrity level than the first ASIL domain.

In one example, the traffic isolation request message is sent by the system fault handler. In one example, the traffic isolation request message is sent by an input/output device. In one example, the traffic isolation request message is sent by a transmitter. In another example, the traffic isolation request message is sent by a transceiver. In yet another example, the traffic isolation request message is sent by a processing engine.

In one example, the traffic isolation request message is received by a domain isolation control module. In one example, the traffic isolation request message is received by a receiver. In one example, the traffic isolation request message is received by a transceiver. In another example, the traffic isolation request message is received by a processing engine. In yet another example, the traffic isolation request message is received by an input/output device.

In block 840, send a traffic block request message for the first ASIL domain. In one example, a traffic block request message is sent for the first ASIL domain. In one example, the traffic block request message initiates blocking of main domain traffic in the main domain island. In one example, the traffic block request message is sent by the domain isolation control module. In one example, the traffic block request message is sent by the system fault handler. In one example, the traffic block request message is sent by an input/output device. In another example, the traffic block request message is sent by a transmitter. In another example, the traffic block request message is sent by a transceiver. In another example, the traffic block request message is sent by a processing engine.

In one example, the traffic block request message is received by a domain flow control module. In one example, the traffic block request message is received by a receiver. In one example, the traffic block request message is received by a transceiver. In another example, the traffic block request message is received by a processing engine. In yet another example, the traffic block request message is received by an input/output device.

In block 850, send a block and flush request message for the first ASIL domain. In one example, a block and flush request message is sent for the first ASIL domain. In one example, the block and flush request message initiates the block operation and the flush operation on the main domain traffic. In one example, the block and flush request message is sent by the domain flow control module. In one example, the block and flush request message is sent by a transmitter. In one example, the block and flush request message is sent by a transceiver. In another example, the block and flush request message is sent by an input/output device. In yet another example, the block and flush request message is sent by a processing engine.

In one example, the block and flush request message is received by a shared communication channel. In one example, the block and flush request message is received by a receiver. In one example, the block and flush request message is received by a transceiver. In another example, the block and flush request message is received by an input/output device. In yet another example, the block and flush request message is received by a processing engine.

In block 860, execute a block operation and a flush operation on the first ASIL domain. In one example, a block operation and a flush operation is executed on the first ASIL domain. In one example, the block operation and the flush operation include a block of incoming traffic from the first ASIL domain. In one example, the block operation and the flush operation include a flush of pending traffic from the first ASIL domain. In one example, the block operation and the flush operation maintain normal operation in the second ASIL domain. In one example, the block operation and the flush operation include a partial reset of the first ASIL domain. In one example, the shared communication channel is a transport path to an external memory. In one example, the external memory is a double data rate (DDR) memory. In one example, the shared communication channel includes a memory address translation.

In one example, the block operation and the flush operation are executed by the shared communication channel. In one example, the block operation and the flush operation are executed by a computer bus. In one example, the block operation and the flush operation are executed by a transmission line. In another example, the block operation and the flush operation are executed by a router. In yet another example, the block operation and the flush operation are executed by a traffic switch.

In block 870, receive at least one acknowledgment message to indicate completion of the block operation and the flush operation on the first ASIL domain. In one example, the at least one acknowledgment message is received to indicate completion of the block operation and the flush operation on the first ASIL domain. In one example, the at least one acknowledgment message may include of one or more of the following: an acknowledgment of completion of the block operation and the completion of the flush operation, an acknowledgment of traffic block completion and an acknowledgment of domain isolation completion.

In one example, the reception of the plurality of acknowledgment messages is performed by the system fault handler. In one example, the at least one acknowledgment message is received by a receiver. In one example, the at least one acknowledgment message is received by a transceiver. In another example, the at least one acknowledgment message is received by an input/output device. In yet another example, the at least one acknowledgment message is received by a processing engine.

In one aspect, one or more of the steps for implementation of freedom from interference (FFI) in electronic systems in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S. C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a system fault handler configured to perform a fault handling;
a domain isolation control module coupled to the system fault handler, the domain isolation control module configured to receive a traffic isolation request message; and
a shared communication channel coupled to the domain isolation control module, the shared communication channel configured to execute a block operation and a flush operation based on the traffic isolation request message to implement freedom from interference (FFI).

2. The apparatus of claim 1, wherein the domain isolation control module is further configured to send a traffic block request message.

3. The apparatus of claim 2, further comprising a first automotive safety integrity level (ASIL) domain coupled to the shared communication channel, the first ASIL domain configured to generate a main domain traffic.

4. The apparatus of claim 3, further comprising a second automotive safety integrity level (ASIL) domain coupled to the shared communication channel, the second ASIL domain configured to generate a safety domain traffic.

5. The apparatus of claim 4, wherein the block operation and the flush operation are executed on the first ASIL domain.

6. An apparatus comprising:
a system fault handler configured to perform a fault handling;
a domain flow control module coupled to the system fault handler, the domain flow control module configured to send a block and flush request message; and
a shared communication channel coupled to the domain isolation control module, the shared communication channel configured to execute a block operation and a flush operation based on the block and flush request message to implement freedom from interference (FFI).

7. The apparatus of claim 6, wherein the domain flow control module is configured to receive a traffic block request message.

8. The apparatus of claim 7, further comprising a first automotive safety integrity level (ASIL) domain coupled to the shared communication channel, the first ASIL domain configured to generate a main domain traffic.

9. The apparatus of claim 8, further comprising a second automotive safety integrity level (ASIL) domain coupled to the shared communication channel, the second ASIL domain configured to generate a safety domain traffic.

10. The apparatus of claim 9, wherein the block operation and the flush operation are executed on the first ASIL domain.

11. An apparatus comprising:
a system fault handler configured to perform a fault handling;
a domain isolation control module coupled to the system fault handler, the domain isolation control module configured to receive a traffic isolation request message;
a domain flow control module coupled to the system fault handler, the domain flow control module configured to send a block and flush request message; and
a shared communication channel coupled to the domain isolation control module, the shared communication channel configured to execute a block operation and a flush operation based on the traffic isolation request message and the block and flush request message, the block operation and the flush operation executed on a first automotive safety integrity level (ASIL) domain to implement freedom from interference (FFI).

12. The apparatus of claim 11, wherein the domain isolation control module is further configured to send a traffic block request message.

13. The apparatus of claim 11, wherein the domain flow control module is configured to receive a traffic block request message.

14. The apparatus of claim 11, wherein the first ASIL domain is configured to generate a main domain traffic.

15. The apparatus of claim 14, further comprising a second ASIL domain coupled to the shared communication channel, the second ASIL domain configured to generate a safety domain traffic.

16. The apparatus of claim 15, wherein the domain isolation control module is further configured to send a traffic block request message.

17. The apparatus of claim 16, wherein the domain flow control module is configured to receive a traffic block request message.

18. An apparatus comprising:
means for initiating a fault handling for a first automotive safety integrity level (ASIL) domain based on a main domain hardware error message;
means for sending a traffic isolation request message for the first ASIL domain;
means for sending a traffic block request message for the first ASIL domain; and
means for executing a block operation and a flush operation on the first ASIL domain based on the traffic isolation request message and the traffic block request message to implement freedom from interference (FFI).

19. The apparatus of claim 18, further comprising means for receiving the main domain hardware error message from the first automotive safety integrity level (ASIL) domain.

20. The apparatus of claim 19, further comprising means for sending a block and flush request message for the first ASIL domain.

21. The apparatus of claim 20, further comprising means for receiving at least one acknowledgment message to indicate completion of the block operation and the flush operation on the first ASIL domain.

22. A method comprising:
initiating a fault handling for a first automotive safety integrity level (ASIL) domain based on a main domain hardware error message;
sending a traffic isolation request message for the first ASIL domain;
sending a traffic block request message for the first ASIL domain; and
executing a block operation and a flush operation on the first ASIL domain based on the traffic isolation request message and the traffic block request message to implement freedom from interference (FFI).

23. The method of claim 22, wherein the main domain hardware error message includes a latent fault checking with duplication.

24. The method of claim 22, wherein the main domain hardware error message is a notification of a latent fault in isolation control.

25. The method of claim 22, wherein the main domain hardware error message is a notification of a latent fault in flow control.

26. The method of claim 25, wherein the notification of the latent fault in flow control includes a lock step check.

27. The method of claim 22, wherein the main domain hardware error message is a notification of an interface protocol fault.

28. The method of claim 27, wherein the interface protocol fault is an invalid request/response command.

29. The method of claim 27, wherein the interface protocol fault is an illegal address.

30. The method of claim 27, wherein the interface protocol fault is an error correction code (ECC) error.

31. The method of claim 27, wherein the interface protocol fault is a parity error.

32. The method of claim 27, wherein the interface protocol fault is a package data fault error.

33. The method of claim 27, wherein the interface protocol fault is a timeout error.

34. The method of claim 22, wherein the traffic isolation request message implements a full isolation of a second automotive safety integrity level (ASIL) domain from the first ASIL domain.

35. The method of claim 34, wherein the second ASIL domain is an ASIL-D domain as defined by ISO 26262.

36. The method of claim 35, wherein the second ASIL domain is at a higher safety integrity level than the first ASIL domain.

37. The method of claim 22, further comprising receiving the main domain hardware error message from the first automotive safety integrity level (ASIL) domain.

38. The method of claim 37, wherein the first ASIL domain is an ASIL-B domain as defined by ISO 26262.

39. The method of claim 37, wherein the first ASIL domain is a main domain island.

40. The method of claim 39, wherein the traffic block request message initiates blocking of a main domain traffic in the main domain island.

41. The method of claim 40, further comprising sending a block and flush request message for the first ASIL domain.

42. The method of claim 41, wherein the block and flush request message initiates the block operation and the flush operation on the main domain traffic.

43. The method of claim 41, further comprising receiving at least one acknowledgment message to indicate completion of the block operation and the flush operation on the first ASIL domain.

44. The method of claim 43, wherein the at least one acknowledgment message includes one or more of the following: an acknowledgment of completion of the block operation and the completion of the flush operation, an acknowledgment of traffic block completion, and an acknowledgment of domain isolation completion.

\* \* \* \* \*